W. B. GOODWIN.
CUSHION VEHICLE WHEEL.
APPLICATION FILED MAY 12, 1919.

1,394,492.

Patented Oct. 18, 1921.

Inventor:
William B. Goodwin
By Walter F. Murray
Attorney.

UNITED STATES PATENT OFFICE.

WILLIAM B. GOODWIN, OF COLUMBUS, OHIO.

CUSHION VEHICLE-WHEEL.

1,394,492.  Specification of Letters Patent.  Patented Oct. 18, 1921.

Application filed May 12, 1919. Serial No. 296,329.

*To all whom it may concern:*

Be it known that I, WILLIAM B. GOODWIN, a citizen of the United States of America, and a resident of Columbus, in the county of Franklin and State of Ohio, have invented a new and useful Improvement in Cushion Vehicle-Wheels, of which the following is a specification.

An object of my invention is to produce an improved cushion vehicle wheel in which greater resiliency and shock absorbing qualities are attained than in other cushion wheels known to me.

A further object is to produce an improved cushion vehicle wheel in which road shocks are absorbed with greater rapidity and with less subsequent rebound or vibration of the wheel, thus contributing greatly to its shock absorbing qualities.

Figure 1:
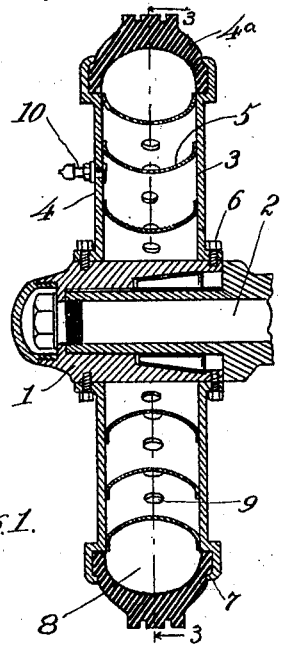
Figure 1 is a diametrical sectional view of a vehicle wheel embodying my invention.
Figure 2:
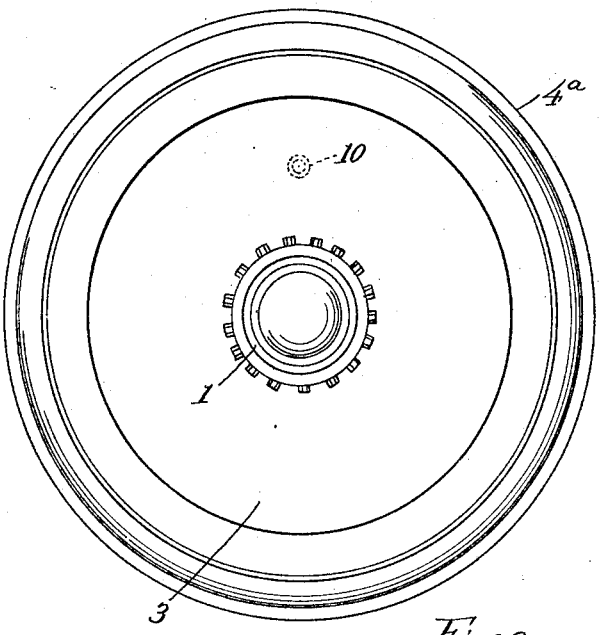
Fig. 2 is a front elevation of a wheel embodying my invention.
Figure 3:
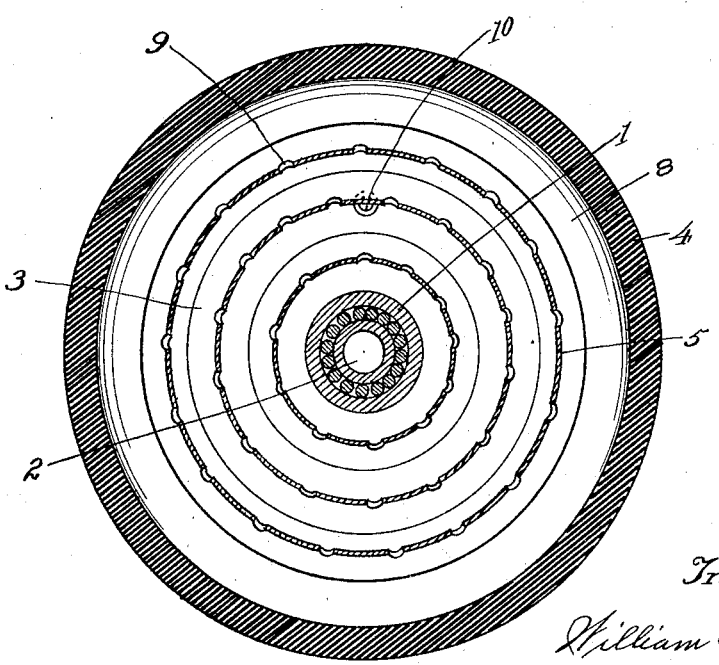
Fig. 3 is a sectional view on line 3—3 of Fig. 1.

The wheel embodying my invention consists essentially of four elements. A hub 1, is located upon the usual axle shaft 2, and is provided with disks 3 and 4 which are secured thereto and at the outer periphery of which is located a resilient member or tire $4^a$, a series of annular rings 5 being located between the disks and between the resilient member and hub in spaced relation to each other. Hub 1 may be of the usual construction, the disks 3 and 4 are secured thereto by means of cap screws or other suitable fastening means 6. At their peripheries the flanges formed on the disks 3 and 4 are inturned as shown at 7, for the purpose of holding the tire $4^a$ in position in much the same manner that clincher tires are held in position upon the usual vehicle wheel rim. The annular rings 5 are located between the disks 3 and 4 and secured thereto in any suitable manner in spaced relation to each other, to the hub and to the tire $4^a$. The rings are arched in cross-section, with the convex sides facing the hub 1, producing a space between the tire $4^a$ and the outer ring of a shape similar to that of the usual pneumatic tire section.

In addition to this the arched shape of the rings also aids in strengthening the rings. Located at spaced intervals in each of the rings are a series of perforations 9 which permit communication of the spaces between adjacent rings, the hub, and the space 8, for a purpose hereinafter more fully described.

Upon outer disk 4, I have located an air valve 10, which communicates with the interior of the wheel and through which air is supplied, under compression, to the spaces between the rings, the hub, the tire, and the disks.

In the use of my improved vehicle wheel the air is pumped up to a pressure sufficient to support the load upon the wheel. Under these conditions the same pressure exists in all the communicating spaces within the wheel. In passing over the road any small obstacle encountered by the tire $4^a$, will compress it sufficiently to compress the air in space 8 but with a relatively quick return to normal condition, so that the air in the remaining spaces will not be materially affected by such an action. As soon as a large obstruction is encountered the tire $4^a$ will be compressed much more than before and the compression in space 8 will extend through openings 9 of the first ring and possibly through the openings of each successive ring, thus transmitting the compression to each of the spaces and consequently throughout the entire air space of the wheel. It will thus be seen that the air space for compression is somewhat automatically increased to take care of varying degrees of compression created by the obstacles encountered.

My improved vehicle wheel acts with equal efficiency in absorbing the rebound occasioned by the original transmission of a shock thereto. After the air has been compressed throughout the entire air compression space of the wheel, it does not immediately return to normal condition. The air in space 8 will return to normal condition first and then the air in the remaining spaces will gradually expand and passing through openings 9 will thus equalize the pressure throughout the entire compression space of the wheel. This action is not instantaneous, and the vehicle will be permitted to recover itself before the air again acts at its full capacity. Thus there can be no bouncing or resulting recoil of the running gear or vehicle body when the vehicle is equipped with cushion wheels embodying my invention.

Having thus described my invention, what I claim is:—

1. A cushion vehicle wheel comprising a hub, annular disks secured to and spaced apart upon the hub, a tire located at the peripheries of the disks, and a series of rings located between the disks, between the hub and the tire, and secured to the disks, said rings being spaced apart, the spaces between the tire and the outermost ring, the hub and the innermost ring, and between the rings communicating.

2. A cushion vehicle wheel comprising a hub, annular disks secured to and spaced apart upon the hub, a tire located at the peripheries of the disks, and a series of concentric arched rings located between the disks, between the hub and the tire, and secured to the disks, the rings having their convex sides facing the hub, said rings being spaced apart, the spaces between the tire and the outermost ring, the hub and the innermost ring, and between the rings communicating.

In testimony whereof, I have hereunto subscribed my name this 9 day of May, 1919.

WILLIAM B. GOODWIN.